United States Patent [11] 3,603,506

[72] Inventor Charles H. Hubbs
 Camp Springs, Md.
[21] Appl. No. 821,201
[22] Filed May 2, 1969
[45] Patented Sept. 7, 1971
[73] Assignees Allan M. Lowe
 Silver Spring, Md.;
 Ralph J. King
 Annandale, Va., part interest to each

[54] UNIVERSAL CHEMICAL DELIVERY SYSTEM
 3 Claims, 4 Drawing Figs.
[52] U.S. Cl. .................................................... 239/1,
 239/171, 239/328
[51] Int. Cl. ....................................................... B05b 17/02
[50] Field of Search ........................................... 239/1, 171,
 328; 169/2 A; 222/92, 107, 215; 244/135, 136,
 136.5, 118; 150/0.5; 220/17, 63

[56] References Cited
UNITED STATES PATENTS

| | | | |
|---|---|---|---|
| 2,504,580 | 4/1950 | Pierson............................. | 239/171 X |
| 3,288,186 | 11/1966 | Headrick......................... | 150/0.5 |
| 3,294,034 | 12/1966 | Bodenheimer et al........ | 244/118 X |
| 3,480,058 | 11/1969 | Harr................................. | 220/63 X |

Primary Examiner—M. Henson Wood, Jr.
Assistant Examiner—Edward D. Grant
Attorney—Harry A. Herbert, Jr.

ABSTRACT: A system is disclosed for dispensing of chemicals from an airplane while in flight to a predetermined area at ground level. The material to be dispensed is stored in a collapsible or deflatable storage means removably positioned within the load space of an airplane. A suitable pumping means may be connected to the storage means and communicates with a spray nozzle assembly detachably affixed to the wing or tail assembly of the airplane for distributing the airborne material over the predetermined ground area.

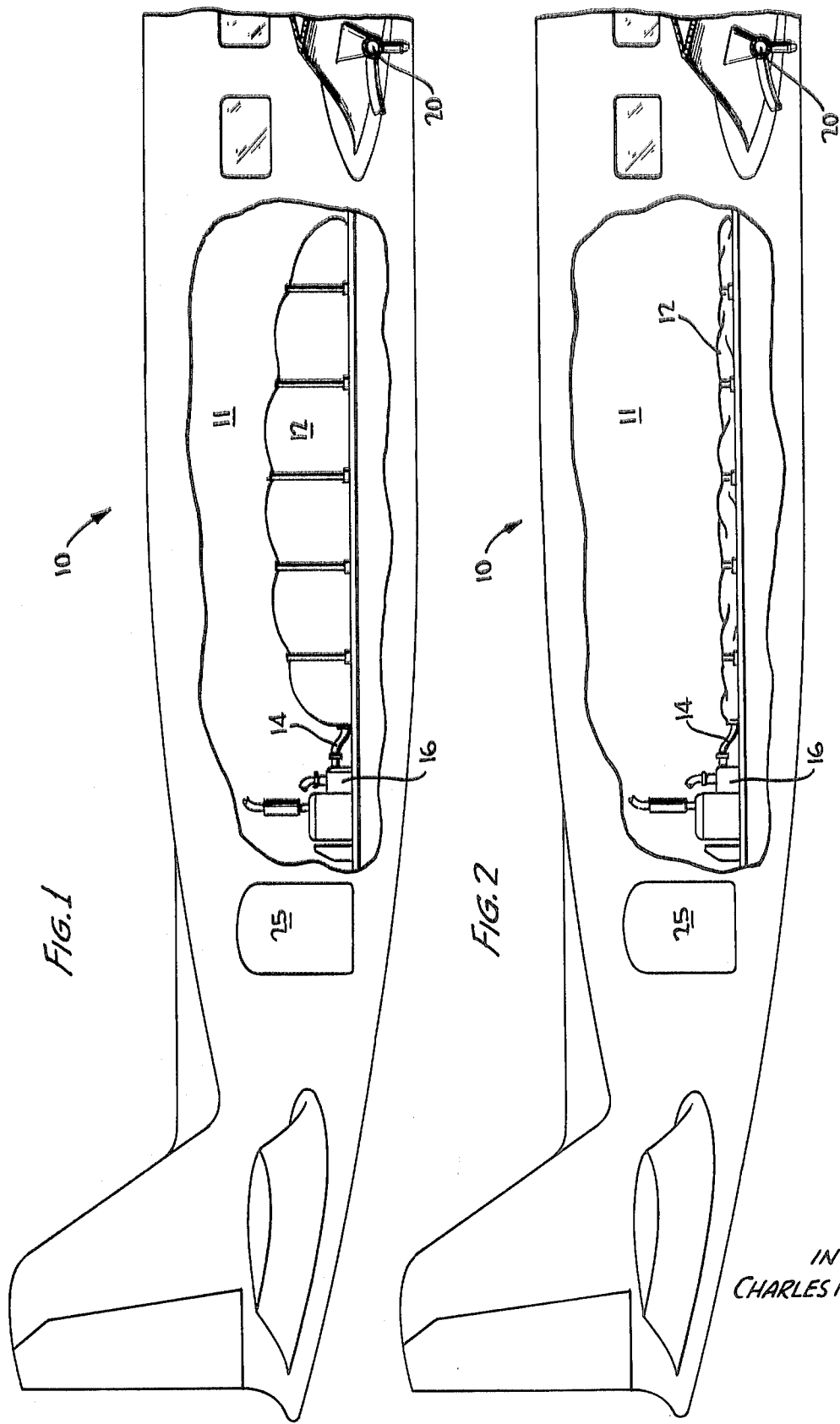

PATENTED SEP 7 1971 3,603,506

INVENTOR,
CHARLES H. HUBBS

UNIVERSAL CHEMICAL DELIVERY SYSTEM

BACKGROUND OF THE INVENTION

This invention pertains to an apparatus for dispensing airborne materials, and to a related method for converting aircraft to perform this function. More particularly, this invention is concerned with a system for the aerial delivery and distribution of solid or liquid chemicals.

The dispensing of airborne chemical materials for distribution to ground level is old and well known. It finds many applications in the dispensing of fertilizers, seeds, insecticides, firefighting chemicals, and the like. It has also been found effective for use in a number of military applications. For example, the aerial delivery of defoliation chemicals has been used with some success for removing foliage cover utilized by enemy troops. However, the overall success of this method of delivering chemical materials has been limited since only certain types of aircraft are suitable for use with the large, rigid storage tanks included in the aerial dispensing systems presently employed.

In general, the aerial dispensing systems utilized heretofore include a storage tank which is rather large, bulky and rigid. It is positioned on a cradle assembly which in turn is anchored inside an aircraft fuselage. A suitable pumping arrangement is also included for delivering the stored chemical materials to a conventional spray boom located on the wing or tail assembly of an aircraft. Because of the bulk and rigidity of the storage tank, only aircraft having a large airframe design are suitable for use with the dispensing system. In addition, the aircraft must possess large clamshell doors preferably with an access ramp as an integral part of the airframe design for loading the tank.

With the present invention, however, the problems associated with the rigidity and bulkiness of the storage tanks used with prior art aerial delivery systems have been abrogated by using a flexible, collapsible bladder-type storage tank in lieu of the large, rigid storage tanks previously utilized. The filled tank by its flexibility advantageously conforms to the interior of the load space of the aircraft being utilized, and any necessary existing equipment can remain in place. This invention thus provides an aerial distribution system that can be utilized with any cargo type of aircraft, whether it be normally an aircraft for transporting freight or one normally including seats for transporting people, thereby making any nation's fleet of aircraft potentially useful for spraying operations. The size of the airframe and access door is no longer a limiting factor; the tank being capable of being loaded and removed in a deflated condition through the existing access opening. Also, when used with detachable spray booms, the delivery system of this invention is especially valuable because the aircraft can be quickly and easily reconverted to its passenger or cargo carrying function. The present system does not require a permanent type installation with special supports and stabilizing elements.

SUMMARY OF THE INVENTION

In accordance with the present invention, it has been found that the aerial delivery of airborne chemicals and materials to a ground area can be effectively accomplished with greater latitude by employing a flexible, deflatable, bladder-type storage tank instead of the rigid type storage tank now utilized. The bladder-type storage vessel is loaded into the aircraft while deflated and is suitably connected by means of flexible conduit and, if necessary, a conventional chemical pump, to a suitable spray boom for discharging the chemical materials stored in the bladder.

Therefore, the primary object of this invention is to provide a novel system for the aerial distribution of airborne chemical materials and the like.

Another object of this invention is to provide an aerial distribution system that can be effectively and easily adapted for use with a wide latitude of airframe designs.

Still another object of this invention is to provide an aerial distribution system that is suitable for dispensing both liquid and particulate materials over a predetermined ground area.

The above and still other objects and advantages of this invention will become apparent upon consideration of the following detailed description thereof when taken in conjunction with the accompanying drawings.

BRIEF DESCRIPTION OF THE DRAWINGS

In the drawings:

FIGS. 1 and 2 are side views, partially broken away for clarity, of an airplane fuselage and showing the system embodying the present invention in two different operative conditions;

DESCRIPTION OF THE PREFERRED EMBODIMENT

Figure 3:
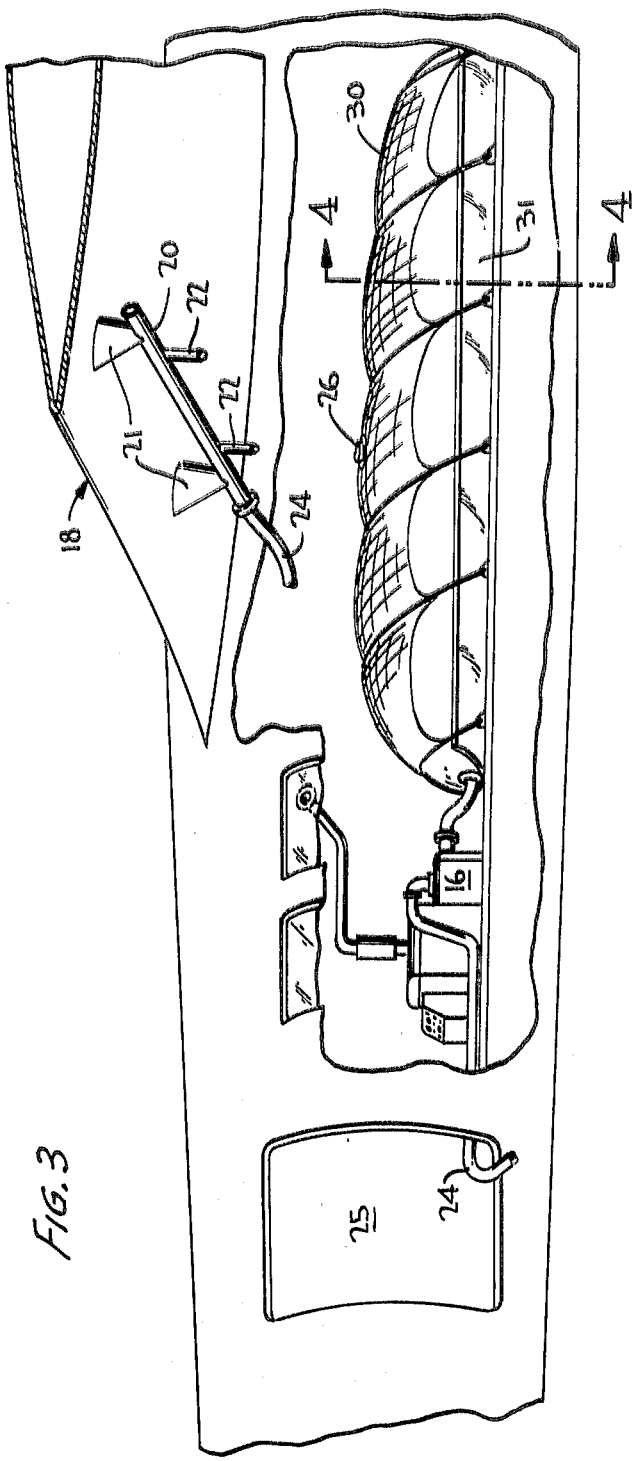
FIG. 3 is an illustration of an airplane fuselage (partially broken away) and wing assembly adapted for the aerial delivery of material in accordance with the teachings of the invention.
Figure 4:
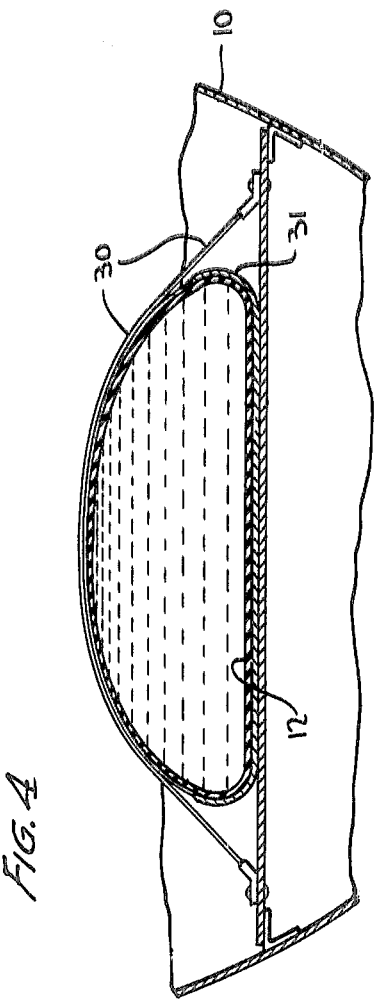
FIG. 4 is a cross-sectional view taken along line 4—4 of FIG. 3.

Referring to the drawings, FIG. 1 shows a portion of an airplane fuselage 10 with a removable dispensing system positioned within the load space 11. The dispenser includes a flexible bladder 12 which has been inflated by filling it with a suitable material to be sprayed, such as a chemical defoliant. As shown, the bladder 12 conforms to the existing load space 11 within the aircraft which thus can be of any standard configuration. In FIG. 2, the storage bladder 12 is shown in the deflated condition and empty of any stored material.

Referring again to FIG. 1, the storage bladder 12 is suitably connected by a flexible conduit 14 to a conventional chemical pump assembly 16 for delivering the stored material under pressure to a spray boom 20 on the exterior of the aircraft for ultimate dispersal to a ground area.

FIG. 3 discloses the airplane fuselage 10 and a portion of a wing assembly 18 to which the spray boom 20 is detachably mounted by struts 21. The spray boom 20 includes suitable spray nozzles 22 for effecting aerial dispersion of the materials stored in the bladder 12 to the atmosphere for delivery to the ground. A conduit 24 interconnects the pump 16 to the spray boom 20, and for ease of converting a standard aircraft, passes through the existing doorway 25. The bladder 12 is provided with an entry port 26 for conveniently filling the same with chemicals and the like. A control console, not shown, may also be connected to the aerial dispenser for controlling the quantity of material discharged through the system.

In combat situations during which aircraft may encounter hostile groundfire, the deflatable bladder or vessel 12 can be adequately secured to the aircraft fuselage by means of a cargo net 30, or other collapsible securing means, with corresponding restraint strengths sufficient to secure a fully loaded bladder. A self-sealing blanket 31 is strapped to the underneath side of the bladder 12 to prevent leaks if a direct hit from the groundfire is taken. A manual dump valve could also be attached to the bladder and connected to a hose for the emergency jettison of the chemical agents if required. The particular nature, size and shape of the bladder used with the system of this invention would of course be determined by the type of aircraft used for delivering the chemical agents, as well as the type of agent to be dispersed.

Particulate or granular materials may also be dispensed by gravity from the bladder storage tank of this invention by providing a conventional airfoil pellet dispensing exit in the airplane fuselage and interconnecting it to the storage bladder. Suitable portholes for dispensing solid particles to the airfoil pellet dispensing exit can be located at the bottom of the bladder. If desired, the central bottom portion of the bladder can be maintained in a raised position by a suitable A-frame type arrangement to facilitate the gravity fall of the particulate material from the bladder downwardly through the pellet exit in the airplane fuselage. The bladder may also be supplied with an internal paddle system for agitating the pellets to facilitate their delivery to the pellet exit.

The airborne dispensing assembly of this invention reduces the weight and cargo area previously required by presently known systems. It allows for loading or installation through any existing opening, such as the doorway 25 which is smaller than the inflated bladder 12. This gives every existing type of aircraft the potential for conversion to the aerial delivery of chemical agents. The aircraft can be reconverted to its basic function with ease since a permanent cradle-type arrangement for holding the storage tank is not required. The bladder 12 has sufficient flexibility to allow it to conform to the shape of the load space 11 for minimum or nonremoval of necessary existing equipment. With the advantages outlined above, it becomes obvious that the present system provides a facile and efficient system for the aerial delivery of airborne chemical agents to a preselected ground area.

The invention has been described with particular reference to a specific embodiment thereof. However, it is to be understood that the description of the invention is for the purpose of illustration only, and it is not intended to limit the invention in any way.

I claim:

1. A method of converting a cargo-type aircraft to dispense chemicals by spraying from a spray boom and aerially dispensing of said chemicals comprising the steps of attaching a spray boom to the exterior portion of an aircraft, loading a collapsible tank for said chemicals into the load space of said aircraft, said tank being deflated during the loading operation and conforming to said load space when in position therein, inflating said deflated tank by introducing a chemical material therein, interconnecting said tank and said spray boom to allow delivery of said chemicals from said tank to said boom, causing said aircraft to become airborne and positioned over a ground target area, providing a pressure differential between said tank and said spray boom to draw the chemicals therefrom and collapse said tank while airborne, and ejecting said chemicals from said spray boom to dispense the chemicals over the target area.

2. The method of claim 1, wherein the loading operation is performed by passing the deflated tank through an existing opening in said aircraft smaller than said tank when inflated.

3. The method of claim 1, wherein said interconnection is accomplished by running a flexible conduit through an existing opening in said aircraft.